United States Patent [19]

Rees et al.

[11] 3,789,051

[45] Jan. 29, 1974

[54] REINFORCED RESIN COMPOSITIONS

[75] Inventors: Richard Watkin Rees, Wilmington; Hans-Georg Reinhardt, Claymont, both of Del.

[73] Assignee: E. I. du Pont de Nemours and Company, Wilmington, Del.

[22] Filed: Sept. 23, 1971

[21] Appl. No.: 183,281

[52] U.S. Cl............................ 260/41 A, 260/41 R, 260/41 AG, 260/885, 260/886
[51] Int. Cl......................... C08f 45/04, C08f 45/10
[58] Field of Search...... 260/885, 41 A, 41 AG, 886

[56] References Cited
UNITED STATES PATENTS

| | | | |
|---|---|---|---|
| 3,517,084 | 6/1970 | Tellier et al. | 260/885 X |
| 3,637,559 | 1/1972 | Pinkney | 260/885 X |
| 3,641,195 | 2/1972 | Ball et al. | 260/41 A X |
| 2,899,402 | 8/1959 | Squire | 260/886 |
| 2,961,423 | 11/1960 | Chapin | 260/886 |
| 3,306,954 | 2/1967 | Moore | 260/886 |

OTHER PUBLICATIONS

Renfrew, Polythene, "The Technology and Uses of Ethylene Polymers," 1958, p. 244, TP 986 P56R4 C.3, (Scientific Library)

1968 "Modern Plastics Encyclopedia," p. 428

*Primary Examiner*—Lewis T. Jacobs

[57] ABSTRACT

A reinforced resin composition comprising A) 20 to 60 percent by weight syrup comprising (1) 40 to 70 percent by weight vinyl substituted aromatic compound containing six aromatic carbon atoms and/or monofunctional ethylenically unsaturated carboxylic acid ester; (2) 10 to 40 percent by weight of an acid monomer system comprising ethylenically unsaturated carboxylic acid; (3) 15 to 35 percent by weight of polymer of vinyl or vinylidene substituted aromatic compound containing six aromatic carbon atoms and/or acrylic polymers; (4) 0.2 to 2.5 percent by weight polymerization catalyst; B) 20 to 60 percent by weight particulate filler; C) 5 to 60 percent by weight fibrous material and D) 1 to 6 equivalents of hydroxides and/or oxides of the Group IIA and IIB metals per equivalent of the ethylenically unsaturated carboxylic acid in the acid monomer system.

16 Claims, No Drawings

REINFORCED RESIN COMPOSITIONS

SPECIFICATION

This invention relates to reinforced resin molding compositions comprising (A) monofunctional ethylenically unsaturated carboxylic acid ester and/or vinyl substituted aromatic compound, alpha,beta-unsaturated carboxylic acid, polymers of vinyl or vinylidene substituted aromatic compound and/or acrylic polymer and polymerization catalyst; (B) particulate filler, (C) fibrous material and (D) thickener.

Reinforced polyester molding compositions are known. These comprise polyester, ethylenically unsaturated monomer, acid functional thermoplastic polymer, filler, fibrous reinforcement and polymerization catalyst. It is also known that such compositions can be thickened by the use of the oxides and hydroxides of the Group I and II metals.

It is also known that fluid liquid resin systems can be prepared from interpolymers of a vinyl compound and an alpha,beta-unsaturated carboxylic acid in a mixture of a vinyl monomer and a monomeric alpha,beta-unsaturated carboxylic acid. These liquid resin systems are crosslinked with compounds such as polyols, polyepoxide, and polyamines.

A composition was sought which after molding would resist distortion at high temperatures and would be corrosion, ultraviolet and impact resistant. Such composition should be moldable at relatively low pressures and temperatures, preferably, should not be water-sensitive and should be dense enough so that it could be processed readily. It should also be reinforced so that it would be tough after molding and preferably have a low profile surface.

A composition has been found which fulfills the above requirements. It is a composition comprising (A) 20 to 60 percent by weight of a syrup comprising (1) 40 to 70 percent by weight of base monomer comprising a member selected from the class consisting of vinyl substituted aromatic compounds containing 6 aromatic carbon atoms, monofunctional ethylenically unsaturated carboxylic acid ester and mixtures thereof; (2) 10 to 40 percent by weight of an acid monomer system comprising 20 to 100 percent by weight ethylenically unsaturated carboxylic acid and 0 to 80 percent by weight of a member selected from the class consisting of ethylene glycol diester of ethylenically unsaturated carboxylic acid, divinyl aromatic compound, difunctional ethylenically unsaturated carboxylic acid ester, ethylenically unsaturated carboxylic acid anhydride, poly-functional amine, aromatic diisocyanate and mixtures thereof; (3) 15 to 35 percent by weight of thermoplastic polymer comprising a member selected from the class consisting of polymers of vinyl substituted aromatic compounds containing 6 aromatic carbon atoms, polymers of vinylidene substituted aromatic compounds containing 6 aromatic carbon atoms, acrylic polymers and mixtures thereof, and (4) 0.2 to 2.5 percent by weight polymerization catalyst; (B) 20 to 60 percent by weight particulate filler; (C) 5 to 60 percent by weight fibrous material, and (D) 1 to 6 equivalents of a member selected from the class consisting of oxides of the Group IIA and IIB metals, the hydroxides of the Group IIA and IIB metals and mixtures thereof per equivalent of the ethylenically unsaturated carboxylic acid in the acid monomer system.

When carboxylic acid is used without prefix throughout the specification and the claims, it is meant to include both the mono- and dicarboxylic acid. Group IIA and IIB refer to the groups from the Periodic Chart of the Elements on page xxii of the *The Condensed Chemical Dictionary*, Seventh Edition by A. & R. Rose, published by Reinhold Book Corporation of New York, 1966. Difunctional as used herein refers to difunctionality consisting of two points of unsaturation or one point of unsaturation and the presence of a group such as epoxy or amino will react with the anion of the ethylenically unsaturated carboxylic acid. The use of the word polymer includes homo, co- and ter- polymer.

The base monomer can be one monomer or a mixture of monomers. The base monomer includes vinyl substituted aromatic compounds. These include compounds in which the aromatic ring is substituted with more than the vinyl group as well as compounds which do not have further substitution. The most preferred base monomer is vinyl substituted aromatic compound containing six aromatic carbon atoms which is preferably styrene. Monofunctional ethylenically unsaturated carboxylic acid ester can be utilized as the base monomer alone or in combination with the above. The preferred ester is methyl methacrylate. The amount of the base monomer present in the syrup is preferably 50 to 60 percent by weight.

The syrup also contains an acid monomer system. It is so named for an ethylenically unsaturated carboxylic acid is always present in the system. The preferred ethylenically unsaturated carboxylic acids are methacrylic and acrylic. These can be used singly or in combination with each other and/or other compounds such as ethylene glycol diesters of ethylenically unsaturated carboxylic acid, divinyl aromatic compound, difunctional ethylenically unsaturated carboxylic acid ester, ethylenically unsaturated carboxylic acid anhydride, polyfunctional amine, aromatic diisocyanate and mixtures of these. As stated above, the latter compounds can be from 0 to 80 percent by weight of the acid monomer system, i.e., they are not necessarily required. The most preferred of the optional compounds are the ethylenically unsaturated carboxylic acid anhydrides, in particular, maleic anhydride, the divinyl aromatic compound, specifically divinyl benzene, and the ethylene glycol diesters of ethylenically unsaturated carboxylic acid, specifically ethylene glycol dimethacrylate and ethylene glycol dimaleate. The amount of these compounds when utilized is preferably about 70 to 75 percent by weight of the acid monomer system.

The other optional compounds of the acid monomer system also contain preferred members. For the difunctional ethylenically unsaturated carboxylic acid ester, the preferreds are glycidyl methacrylate and diallyl phthalate. The preferred polyfunctional amine is diethylene triamine and the preferred aromatic diisocyanate is toluene-2,4-diisocyanate. The acid monomer system is preferably 15 to 25 percent by weight of the syrup.

Included in the syrup is thermoplastic polymer. This polymer must be soluble in the monomer system made up of the base monomer and acid monomer system. The polymer can be added to the monomers as a separate component or can be prepared in situ in the monomers by partial polymerization of the monomers. The thermoplastic polymers which are useful are polymers of vinyl substituted aromatic compounds containing six aromatic carbon atoms (including vinyl substituted aromatic compounds in which the aromatic ring is substituted with more than the vinyl group), preferably polystyrene, or copolymers containing styrene such as styrene/acrylonitrile copolymer. Also useful are polymers of vinylidene substituted aromatic compounds (including compounds with additional substitution in the aromatic ring) containing six aromatic carbon atoms such as alpha-methyl styrene, preferably as co- or ter- polymers. A preferred polymer of this type is a polymer of alpha-methyl styrene and methyl methacrylate.

Acrylic polymers are also useful as the thermoplastic polymer in the composition. These can be homopolymers, copolymers, and terpolymers but do not include co- and terpolymers with vinyl or vinylidene substituted aromatic compounds of six aromatic carbon atoms, these being included in the two classes of polymers discussed above. Preferred acrylic polymers include polymethyl methacrylate, methyl methacrylate/ethyl acrylate copolymers wherein the copolymer is 0.5 to 25 percent by weight ethyl acrylate polymerized units, methyl methacrylate/ethyl acrylate/glycidyl methacrylate terpolymers, methyl methacrylate/isobutyl methacrylate/methacrylic or acrylic acid terpolymer wherein the isobutyl methacrylate polymerized units are up to 25 percent by weight of the terpolymer and the acid polymerized units are up to 10 percent by weight of the terpolymer, methyl methacrylate/methacrylic acid copolymers wherein the methacrylic acid polymerized units are up to 10 percent by weight of the copolymer, ethyl methacrylate/methacrylic acid copolymers wherein the methacrylic acid polymerized units are up to 10 percent by weight of the copolymer, methyl methacrylate/ethyl acrylate/maleic anhydride terpolymers containing up to about 20 percent by weight ethyl acrylate polymerized units and up to 10 percent by weight maleic anhydride polymerized units. The polystyrene and the methyl methacrylate/isobutyl methacrylate/methacrylic and/or acrylic acid terpolymers are the most preferred. The amount of the thermoplasic polymer in the syrup is preferably 20 to 30 percent by weight.

Polymerization catalysts are also included in the syrup. The composition is such, however, that the monomers are not polymerized to any substantial degree until the composition is molded at elevated temperatures and pressure. The preferred catalysts are t-butyl peroctoate; t-butyl perbenzoate; t-butyl peracetate; di-t-butyl-diperoxyphthalate; 2,5-dimethyl-2,5-bis-(2-ethylhexanoylperoxy) hexane; 2,5-dimethyl-2,5-bis(benzoyl-peroxy)hexane; 1,1,3,3-tetramethyl-2-ethylhexanoate; 2,5-dimethyl-b 2,5-bis(t-burylperoxy)hexane; 2,5-dimethyl-2,5-bis(t-butylperoxy)hexyne-3; peroxides such as dibenzoyl peroxide and dicumyl peroxide and other vinyl polymerization catalysts such as azo catalysts. The most preferred catalyst is t-butyl perbenzoate or dibenzoyl peroxide or a combination of the two. A preferred amount of the catalyst utilized is about 0.5 to 1.5 percent based on the total amount of the syrup.

The syrup can contain various other components such as polyolefins for example polyethylene, polypropylene and ethylene vinyl acetate copolymer. If the polyolefin is included in the syrup, it will comprise up to 20 percent by weight of the syrup with the preferred amount being from 1 to 5 percent. The molecular weight of the polyolefin is normally from 50,000 to 500,000.

Other compositions which can be present in the syrup are polymerization accelerators which include cobalt salts such as cobalt naphthenate, manganese salts such as manganese naphthenate, tertiary amines, secondary amines, for example dimethyl aniline, dimethyl paratoluidene or diethyl aniline and aryl ethanol amines. Such accelerators are normally present if present at all in concentrations from 0.01 to 1 percent by weight of the syrup.

Commercial grade monomers such as styrene, methacrylic acid and methyl methacrylate normally contain polymerization inhibitors which of course are also present in the syrup. These inhibitors prevent the monomers from polymerizing prematurely, i.e., before the molding of the composition or before partial polymerization if the thermoplastic polymer is prepared in situ. Examples of such inhibitors are t-butylcatechol, benzaldehyde, tetrachloroquinone, and hydroquinone. The inhibitors are normally present in the monomers to the extent of 5 to 100 parts per million by weight.

The syrup is thickened by the use of the oxides or hydroxides of Group IIA and IIB metals. This thickening allows for easy handling of the composition before molding and for uniform molding. The preferred oxides of the Group IIA and IIB metals are calcium oxide, barium oxide, magnesium oxide, and zinc oxide, while the preferred hydroxides are calcium hydroxide, barium hydroxide and magnesium hydroxide. The most preferred is zinc oxide. When the ethylenically unsaturated carboxylic acid is used singly in the syrup, preferably both magnesium oxide and zinc oxide are used. When the ethylenically unsaturated carboxylic acid is used with another component such as ethylene glycol dimethacrylate, zinc oxide is preferably used. The amount of oxide and/or hydroxide utilized is critical and can vary from 1 to 6 equivalents of the oxide or hydroxide per equivalent of the ethylenically unsaturated carboxylic acid. Preferably, 1.1 to 2.5 equivalents of the oxide and/or hydroxide are used per equivalent of the ethylenically unsaturated carboxylic acid.

Particulate fillers are also present in the composition. The preferred fillers are calcium carbonate with an average particle size between 0.05 and 4 microns and ground limestone which has a particle size from 3 to 11 microns. Other fillers include clay, kaolin, aluminas, silica, wood flour, expanded perlite, quartz, calcium silicate and barium sulfate and asbestos powders. The amount of filler utilized is preferably from 45 to 55 percent by weight of the total composition.

The composition is reinforced with fibrous material such as chopped glass, glass mat, polyvinyl alcohol fiber, sisal fibers, cotton fibers, asbestos fibers, and jute. The most preferred fiber is the chopped glass. The amount of fibers utilized is preferably 15 to 30 percent by weight. The length of the fibers of the fibrous material varies depending upon the type of composition that is being prepared.

There are two types of compositions which are normally produced. These are the bulk molding composition and sheet molding composition. The bulk molding composition is prepared by blending the syrup, particulate filler, syrup and oxides and/or hydroxides of the Group IIA and IIB metals while the sheet molding composition is prepared by blending the syrup with the particulate filler and the oxides and/or hydroxides of the Group IIA and IIB metals to form a paste and then forming two layers of paste. In between the two layers of paste are laid the fibrous material. This laminate precursor and the bulk molding composition are molded by the use of heat and pressure. The pressures utilized can be as low as 150 psi. while the temperature ranges from 130° to 200°C. If the bulk molding composition is being prepared, the length of the fibers in the fibrous material will be from one-fourth inch to 3 inches whereas if the sheet molding composition is being prepared, the fibers will vary from one-half to 3 inches in length.

Lubricants and release agents can be included in the composition. These are useful in allowing the shape which is to be molded to be readily released from the mold. Examples of such release agents and lubricants are microfine polyethylene powder which has a density of about 0.924 gram per cubic centimeter and an average particle size of less than 30 microns and is sold under the trademark "Microthene" FN 510 (USI Chemicals); metal stearates, e.g., zinc stearate, calcium stearate and aluminum stearate; stearic acid and other fatty acids and their salts; phosphates such as "Zelec" UN, "Zelec" NE and "Ortholeum" (Du Pont); sulfonates; diethyl sodium sulfosuccinate and organic titanates. The phosphates can be either included in the composition or are sometimes doped on the mold. The amount of lubricant or release agent if it is included in the composition is normally from 0 to 5 percent by weight of the syrup. The preferred amount is about 2 percent by weight.

Other components which may be included in the composition are colorants, pigments, etc.

The composition is prepared by blending the components of the syrup and then blending this with the particulate filler and oxides and/or hydroxides of the Group IIA and IIB metals which have been previously blended. The fibrous material is then incorporated into the blend if the bulk molding composition is to be prepared or if the sheet molding composition is to be prepared, a paste is formed from the blend and the fibrous material sandwiched between two layers of the paste.

The composition can be compression molded, injection molded or transfer molded into various shapes. Examples of such shapes are shower stalls, automobile bodies, appliance housings, building panels, etc.

The following Examples are meant to illustrate but not to limit the invention. All parts are by weight unless otherwise specified. In the Examples heat distortion temperature is determined according to ASTM D-648, Izod impact according to ASTM D-256, oxygen index according to ASTM D-2863-70, arc resistance according to ASTM D-495, flexural modulus according to ASTM D-790 and flexural strength according to ASTM D-790.

EXAMPLE I

A 4-oz. jar filled with 10.6 g. styrene, 2.9 g. ethylene glycol dimethacrylate, 1.0 g. methacrylic acid, 0.2 g. t-butyl perbenzoate and 4.8 g. of a terpolymer of 76 parts methyl methacrylate, 20 parts isobutyl methacrylate and 4 parts methacrylic acid was rolled in the dark for 16 hours on a ball mill. A second jar filled with 22.85 g. calcium carbonate (particle size - 0.1 micron, "Dacote" - Diamond Shamrock Chemical Co.), 1.5 g. zinc oxide, 0.4 g. zinc stearate and 0.4 g. "Microthene" FN 510 was rolled on a ball mill for 25 minutes.

The powdery mixture of the second jar was added to the liquid under agitation with a spatula until an even, highly viscous white paste derived. The ratio of equivalents of zinc oxide to methacrylic acid was 3:19. This paste was charged into a "Brabender" plastograph (Brabender Corp.) equipped with chrome-plated sigma-shaped blades. At a speed of 25 rpm, 11 g. one-fourth inch chopped strands of Owens-Corning Fiberglas (OCF) K832DB glass fibers (nominal filament diameter 0.00051 inch, 102 filaments per fiber) were added to the paste under air cooling. After charging with glass fibers the plastograph was run for 3 minutes at 75 rpm and discharged.

43.6 G. of the derived tan premix were molded in a preheated press in a 4 × 4 × 0.1 inch chase between 0.005 inch aluminum foil backed up by nickel plates at 960 psi. for 5 minutes. The temperature of the press was increased from 150° to 180°C. during molding. The plates were removed from the hot press and the aluminum foil from the cured plaque after cooling to room temperature. The resulting opaque white plaque had a void- and fiber-free smooth surface.

Heat distortion temperature at 264 psi. 201°C.
Izod impact, notched 1.9 ft-lb/in.

EXAMPLE II

A mixture of 128.0 g. styrene, 46.4 g. methacrylic acid, 2.4 g. t-butyl perbenzoate and 57.6 g. of a terpolymer of 76 parts methyl methacrylate, 20 parts isobutyl methacrylate and 4 parts methacrylic acid was stirred in the dark for 16 hours. To 19.5 g. of this liquid mixture was added a powdery mixture of 21.0 g. calcium carbonate (particle size - 0.1 micron, "Dacote" - Diamond Shamrock Chemical Co.), 0.85 g. magnesium oxide, 2.5 g. zinc oxide, 0.4 g. "Microthene" FN 510 and 0.4 g. calcium stearate under agitation as in Example I. The resulting paste was mixed with 11 g. of one-fourth inch glass fibers (nominal filament diameter 0.00051 inch, 102 filaments per fiber) and molded under the same conditions as in Example I; however, "Apollo Mirror Finish Chrome Ferrotype Plates" (Repro Corp., 111 West 21st Street, Wilmington, Delaware) were used instead of aluminum foil and the temperature was raised from 150° to 165°C. during molding. An opaque, white plaque resulted with a void- and fiber-free smooth surface.

Heat distortion temperature at 264 psi. 192°C.
Izod impact, notched 1.1 ft-lb/in.

EXAMPLE III

A mixture of 63.6 g. styrene, 23.4 g. methacrylic acid, 1.2 g. t-butyl perbenzoate and 28.8 g. of a terpolymer of 95.4 parts methyl methacrylate, 4.5 parts ethyl acrylate and 0.1 part glycidyl methacrylate was stirred in the dark for 16 hours. To 19.5 g. of this liquid mixture was added a mixture of 21.35 g. calcium carbonate (particle size - 0.1 micron, "Dacote" - Diamond Shamrock Chemical Co.), 3.0 g. zinc oxide, 0.4 g. zinc stearate, 0.4 g. "Microthene" FN 510 under agitation as in Example I. The mixing with one-fourth inch glass fibers (nominal filament diameter 0.00051 inch, 102 filaments per fiber) and the molding occurred under the same conditions as in Example I, except the molding temperature was raised from 146°C. to 170°C. during molding. The resulting plaque had a white opaque, void- and fiber-free smooth surface.

Heat distortion temperature at 264 psi. 209°C.
Izod impact, notched 1.2 ft-lb/in.

EXAMPLE IV

A liquid solution containing 5.3 g. styrene, 1.95 g. methacrylic acid, 0.1 g. t-butyl perbenzoate and 2.4 g. polystyrene was added to a liquid solution containing 5.3 g. styrene, 1.45 g. ethylene glycol dimethacrylate, 0.5 g. methacrylic acid, 0.1 g. t-butyl perbenzoate and 2.4 g. of a terpolymer of 76 parts methyl methacrylate, 20 parts isobutyl methacrylate and 4 parts methacrylic acid. Then the procedure of Example I was followed, except the molding temperature was kept constant at 170°C. The resulting plaque had a low profile surface as in Example I.

Heat distortion temperature at 264 psi. 204°C.
Izod impact, notched 1.2 ft-lb/in.

EXAMPLE V

A liquid solution containing 5.3 g. styrene, 1.95 g. methacrylic acid, 0.1 g. t-butyl perbenzoate and 2.4 g. polystyrene was added to a liquid solution containing 5.3 g. styrene, 1.95 g. methacrylic acid, 0.1 g. t-butyl perbenzoate and 2.4 g. of a terpolymer of 76 parts methyl methacrylate, 20 parts isobutyl methacrylate and 4 parts methacrylic acid. The liquid mixture was mixed under agitation with a solid mixture containing 21.0 g. calcium carbonate (particle size - 0.1 micron, "Dacote" - Diamond Shamrock Chemical Co.), 0.85 g. magnesium oxide, 2.5 g. zinc oxide, 0.4 g. "Microthene" FN 510 and 0.4 g. calcium stearate. The resulting paste was mixed with 11 g. one-fourth inch glass fibers (nominal filament diameter 0.00051 inch, 102 filaments per fiber) and molded as in Example IV. The product was a white, opaque plaque with a low profile surface.

Heat distortion temperature at 264 psi. 195°C.
Izod impact, notched 1.2 ft-lb/in.

EXAMPLE VI 4.8 G. of a terpolymer of 95.4 parts methyl methacrylate, 4.5 parts ethyl acrylate and 0.1 part glycidyl methacrylate were dissolved with stirring during 16 hours in a mixture of 10.6 g. styrene, 2.9 g. ethylene glycol dimethacrylate, 1 g. methacrylic acid, and 0.2 g. t-butyl perbenzoate. A mixture of 29.3 g. calcium carbonate (particle size - 0.1 micron, "Dacote" - Diamond Shamrock Chemical Co.), 1.1 g. zinc oxide and 0.4 g. zinc stearate was added with agitation to 13.75 g. of the liquid solution above. Then the procedure of Example I was followed. The premix was molded at 960 psi. for 5 minutes at a temperature rising from 150° to 170°C. during the molding. The product was a white, opaque plaque with a low profile surface.

Heat distortion temperature at 264 psi. 196°C.
Izod impact, notched 1.3 ft-lb/in.

EXAMPLE VII

A mixture of 128 g. styrene, 46.4 g. methacrylic acid, 2.4 g. t-butyl perbenzoate and 57.6 g. of a terpolymer of 95.4 parts methyl methacrylate, 4.5 parts ethyl acrylate and 0.1 part glycidyl methacrylate was stirred in the dark for 16 hours. To 19.5 g. of this liquid solution was added a mixture of 21.0 g. calcium carbonate (particle size - 0.1 micron, "Dacote" Diamond Shamrock Chemical Co.), 0.85 g. magnesium oxide, 2.5 g. zinc oxide and 0.4 g. "Microthene" FN 510. Then the procedure of Example I was followed. The premix was molded at temperatures rising from 150° to 167°C. during molding. The cured bulk molding compound had an excellent low profile, void-free surface.

Heat distortion temperature at 264 psi. 215°C.
Izod impact, notched 1.2 ft-lb/in.

EXAMPLE VIII

The same procedure as used in Example VI was followed except that 0.4 g. "Microthene" FN 510 was added to the filler. The premix was molded at a temperature rising from 150° to 170°C. during molding. The resulting plaque had the following properties:

Heat distortion temperature at 264 psi. 200°C.
Izod impact, notched 1.2 ft-lb/in.

EXAMPLE IX

A 4-oz. jar filled with 10.6 g. styrene, 2.9 g. ethylene glycol dimethacrylate, 1.0 g. methacrylic acid, 0.2 g. t-butyl perbenzoate and 4.8 g. of a terpolymer of 76 parts methyl methacrylate, 20 parts isobutyl methacrylate and 4 parts methacrylic acid was rolled in the dark for 16 hours on a ball mill. A second jar filled with 22.85 g. calcium carbonate (particle size - 0.1 micron, "Dacote" - Diamond Shamrock Chemical Co.), 1.5 g. zinc oxide, 0.4 g. zinc stearate and 0.4 g. "Microthene" FN 510 was rolled on a ball mill for 25 minutes.

The powdery mixture of the second jar was added to the liquid under agitation with a spatula until an even, highly viscous white paste derived. This paste was charged into a "Brabender" plastograph (Brabender Corp.) equipped with chrome plates and cam-style rollers. At a speed of 25 rpm, 11 g. one-fourth inch chopped strands of OCF K832 glass fibers (nominal filament diameter 0.00051 inch, 102 filaments per fiber) were added to the paste under air cooling. After charging with glass fibers, the plastograph was run for 5 seconds at 50 rpm and discharged.

44.3 G. of the derived tan premix were molded in a preheated press in a 4 × 4 × 0.1 inch chase between 0.005 inch aluminum foil backed up by nickel plates at 960 psi. for 2 minutes. The temperature of the press was increased from 162° to 163°C. during molding. The plates were removed from the hot press and the aluminum foil from the cured plaque after cooling to room temperature. The opaque white plaque had a void- and fiber-free smooth surface.

Heat distortion temperature at 264 psi. 250°C.
Izod impact, notched 5.9 ft-lb/in.

EXAMPLE X

A mixture of 128.0 g. styrene, 46.4 g. methacrylic acid, 2.4 g. t-butyl perbenzoate and 57.6 g. of a terpolymer of 76 parts methyl methacrylate, 20 parts isobutyl methacrylate and 4 parts methacrylic acid was stirred in the dark for 16 hours. To 19.5 g. of this liquid mixture was added a powdery mixture of 21.0 g. calcium carbonate (particle size 3 microns, "Camel-Wite"- Harry T. Campbell & Sons Co., Baltimore, Md.), 0.9 g. magnesium oxide, 1.8 g. zinc oxide, 0.4 g. "Microthene" FN 510 and 0.4 g. calcium stearate under agitation as in Example I. The resulting paste was mixed with 11 g. one-fourth inch glass fibers (Johns-Manville CS-308A) (filament diameter - 0.00055, inch 400 filaments per fiber) in the plastograph. 43.0 G. premix were molded at 160°C., 1,000 psi. for 2 minutes in a 4 × 4 × 0.1 inch chase between 0.005 inch aluminum foil backed by nickel plates. The opaque white plaque had a void- and fiber-free smooth surface.

Heat distortion temperature at 264 psi. 232°C.
Izod impact, notched 4.5 ft-lb/in.

EXAMPLE XI

A 4-oz. jar filled with 7.7 g. styrene, 2.9 g. methyl methacrylate, 2.9 g. ethylene glycol dimethacrylate, 1.0 g. methacrylic acid, 0.2 g. t-butyl perbenzoate and 4.8 g. of a terpolymer of 76 parts methyl methacrylate, 20 parts isobutyl methacrylate and 4 parts methacrylic acid was rolled in the dark for 16 hours on a ball mill. A second jar filled with 22.85 g. calcium carbonate (particle size - 0.1 micron, "Dacote" - Diamond Shamrock Chemical Co.), 1.5 g. zinc oxide, 0.4 g. zinc stearate and 0.4 g. "Microthene" FN 510 was rolled on a ball mill for 25 minutes. The powdery mixture of the second jar was added to the liquid under agitation with a spatula until an even highly viscous white paste derived. This paste was charged into the plastograph equipped with chrome-plated sigma-style blades. At a speed of 25 rpm, 11 g. one-fourth inch chopped strands of glass fibers (nominal filament diameter 0.00051 inch, 102 filaments per fiber) were added to the paste. After charging with glass fibers, the plastograph was run for 3 minutes at 75 rpm. 43.6 G. of the derived premix were molded for 5 minutes at < 1,000 psi. in a 4 × 4 × 0.1 inch chase between "Teflon"-coated aluminum foil. During the molding, the temperature was raised from 150° to 175°C. A white, opaque plaque with a fiberfree surface was obtained.

Heat distortion temperature at 264 psi. 185°C.
Izod impact, notched 1.2 ft-lb/in.

EXAMPLE XII

A liquid solution containing 5.3 g. styrene, 1.95 g. methacrylic acid, 0.1 g. t-butyl perbenzoate and 2.4 g. polystyrene was added to a liquid solution containing 5.3 g. styrene, 1.95 g. methacrylic acid, 0.1 g. t-butyl perbenzoate and 2.4 g. of a terpolymer of 76 parts methyl methacrylate, 20 parts isobutyl methacrylate and 4 parts methacrylic acid. The liquid mixture was mixed under agitation with a solid mixture containing 21.0 g. calcium carbonate (same as Example I), 0.85 g. magnesium oxide, 2.5 g. zinc oxide, 0.4 g. "Microthene" FN 510 and 0.4 g. calcium stearate. The resulting paste was mixed with 11 g. one-fourth inch glass fibers (same as in Example I) in the "Brabender" plastograph for 3 minutes at 75 rpm. 43.6 G. premix were molded at <1,000 psi. for 5 minutes in a 4 × 4 × 0.1 inch chase at 150° to 170°C. A white, opaque plaque with a void- and fiber-free surface was obtained.

Heat distortion temperature at 264 psi. 195°C.
Izod impact, notched 1.2 ft-lb/in.

EXAMPLE XIII

A liquid solution containing 5.3 g. styrene, 1.95 g. methacrylic acid, 0.1 g. t-butyl perbenzoate and 2.4 g. polystyrene was added to a liquid solution containing 5.3 g. styrene, 1.95 g. methacrylic acid, 0.1 g. t-butyl perbenzoate and 2.4 g. of a terpolymer of 95.4 parts methyl methacrylate, 4.5 parts ethyl acrylate and 0.1 part glycidyl methacrylate. The liquid mixture was mixed under agitation with a solid mixture containing 21.65 g. calcium carbonate (same as Example I), 0.9 g. magnesium oxide, 1.8 g. zinc oxide, 0.4 g. "Microthene" FN 510 and 0.4 g. calcium stearate. The resulting paste was mixed with glass fibers as in Example XII and molded 5 minutes at 170°C. to a white, opaque plaque with a void- and fiber-free surface (4 × 4 × 0.1 inch).

Heat distortion temperature at 264 psi. 220°C.
Izod impact, notched 1.1 ft-lb/in

EXAMPLE XIV 4.8 G. of a terpolymer of 95.4 parts methyl methacrylate, 4.5 parts ethyl acrylate and 0.1 part glycidyl methacrylate were dissolved in a mixture of 10.0 g. styrene, 2.2 g. methacrylic acid, 2.3 g. of a solution which was 80 percent by weight toluene-2,4-diisocyanate and 20 percent by weight toluene-2,6-diisocyanate and 0.2 g. t-butyl perbenzoate. A powdery mixture of 23.15 g. calcium carbonate (same as Example I), 1.2 g. zinc oxide, 0.4 g. "Microthene" FN 510 and 0.4 g. zinc stearate was added to the liquid organic mixture and mixed with 11 g. glass fibers as in Example XIII. 43.95 G. premix were molded for 5 minutes at < 1,000 psi. at a temperature raised from 145° to 175°C. to a light brown 4 × 4 × 0.1 inch plaque which had a void- and fiber-free surface.

Heat distortion temperature at 264 psi. 160°C.
Izod impact, notched 1.6 ft-lb/in.

EXAMPLE XV

A powder mixture containing 22.85 g. calcium carbonate (same as in Example I), 1.5 g. zinc oxide, 0.4 g. zinc stearate, 0.4 g. "Microthene" FN 510 was added to a liquid containing 10.6 g. styrene, 2.9 g. ethylene glycol dimethacrylate, 1.0 g. methacrylic acid, 0.2 g. t-butyl perbenzoate and 4.8 g. of a terpolymer of 76 parts methyl methacrylate, 20 parts isobutyl methacrylate and 4 parts methacrylic acid. A white, even paste was derived by stirring with a spatula for about 1 minute. After 16 hours the paste was pressed in a lab press at room temperature to a flat sheet of about 0.050 inches thickness. 8.7 G. 1 inch glass fibers (same diameter as in Example I) were placed between two layers of the flattened paste. Each layer had a weight of 17.5 g. The sheet molding composition premix was placed between two layers of polyethylene film and pressed in a lab press at room temperature so that the fibers were wetted by the paste. The sheet molding composition premix was then placed in a 4 × 4 × 0.1 inch chase between aluminum foil and molded 5 minutes at < 1,000 psi. at 160°. A completely cured plaque was obtained. It was opaque and very tough and did not show any fiber prominence.

Izod impact, notched 15.9 ft-lb/in.

EXAMPLE XVI

A powdery mixture containing 22.35 g. calcium carbonate (same as in Example I), 1.5 g. zinc oxide and 0.5 g. magnesium oxide was added to a liquid containing 10.6 g. styrene, 2.9 g. ethylene glycol dimethacrylate, 1.0 g. methacrylic acid, 0.2 g. t-butyl perbenzoate and 4.8 g. of a terpolymer of 76 parts methyl methacrylate, 20 parts isobutyl methacrylate and 4 parts methacrylic acid. The mixture was agitated until an even highly viscous white paste derived. This paste was charged into the "Brabender" plastograph equipped with chrome plated cam-style rollers. Then the procedure of Example IX was followed. 42.65 G. premix were molded at 160°C. The opaque, white plaque had a void- and fiber-free smooth surface.

Heat distortion temperature at 264 psi. 240°C.
Izod impact, notched 4.5 ft-lb/in.

EXAMPLE XVII

A liquid mixture of 10.6 g. methyl methacrylate, 4.8 g. of a terpolymer of 76 parts methyl methacrylate, 20 parts isobutyl methacrylate and 4 parts methacrylic acid, 2.9 g. ethylene glycol dimethacrylate, 1 g. methacrylic acid, and 0.2 g. t-butyl perbenzoate was added to a powdery mixture of 22.85 g. calcium carbonate (same as in Example I), 1.5 g. zinc oxide, 0.4 g. zinc stearate, and 0.4 g. "Microthene" FN 510. It was mixed in a 4-oz. jar with a spatula to a paste. 11 G. one-fourth inch glass fibers (same as in Example I) were added in the plastograph to this paste and mixed 5 seconds at 50 rpm using cam-style rollers. 43.6 G. of the premix were molded in a 0.1 × 4 × 4 inch chase at 1,000 psi., 160°C. for 2 minutes between aluminum foil backed by nickel plates. A white opaque plaque was obtained.

Heat distortion temperature 247°C.
Izod impact, notched 4.6 ft-lb/.in.

EXAMPLE XVIII

A liquid mixture containing 10.6 g. styrene, 2.9 g. ethylene glycol dimethacrylate, 1.0 g. methacrylic acid, 0.2 g. t-butyl perbenzoate and 4.8 g. of a terpolymer of 76 parts methyl methacrylate, 20 parts isobutyl methacrylate and 4 parts methacrylic acid was added to a powdery mixture containing 23.85 g. asbestos powder (Asbetos fibers 7T-15-Johns-Manville) (length - 854,000 to 1,400,000 per linear inch, diameter - 0.000000706 to 0.00000118 inch), 1.5 g. zinc oxide, 0.4 g. zinc stearate and 0.4 g. "Microthene" FN 510. After mixing with a spatula to an even paste, the paste was placed into the plastograph and mixed with 11 g. one-fourth inch glass fibers OCF K840AA (nominal filament diameter - 0.00051 inch, 204 filaments per fiber) at 75 rpm for 3 minutes using Sigma-blades. 43.5 G. of the premix were molded at 145° to 170°C. for 5 minutes, < 1,000 psi. between aluminum foil backed by nickel plates. An opaque, gray plaque was the product.

Heat distortion temperature 235°C.
Oxygen index 23.1%

EXAMPLE XIX

A liquid mixture containing 10.6 g. styrene, 2.9 g. ethylene glycol dimethacrylate, 1.0 g. methacrylic acid, 0.2 g. t-butyl perbenzoate and 4.8 g. of a terpolymer of 76 parts methyl methacrylate, 20 parts isobutyl methacrylate and 4 parts methacrylic acid was mixed with a spatula with a powdery mixture (mixed on a ball mill) of 24.8 g. alumina trihydrate "Hydral 710" ("Alcoa"), 0.75 g. zinc oxide, 0.3 g. zinc stearate and 0.3 g. "Microthene" FN 510. The paste was placed into the plastograph and 11 g. one-fourth inch glass fibers (same as Example I) were added and mixed after completion of the adding at low speed at 50 rpm. for 5 seconds using cam-style rollers.

42.8 G. of the premix were molded at 160°C. for 2 minutes at 1,000 psi. in a 4 × 4 × 0.1 inch chase between aluminum foil backed by nickel plates. The plates were removed from the hot pans. The molded plaque had a void- and fiber-free surface.

Izod impact, notched 4.2 ft-lb/in.

Oxygen index 29.8%
Heat distortion temperature 243°C.
Arc resistance 184 seconds

EXAMPLE XX

A powdery mixture containing 21.0 g. kaolin (Freeport Kaolin Co. Kaoline OX-1), 0.85 g. magnesium oxide, 2.5 g. zinc oxide, 0.4 g. "Microthene" FN 510 and 0.4 g. calcium stearate was added to a liquid mixture containing 10.6 g. styrene, 3.9 g. methacrylic acid, 0.2 g. t-butyl perbenzoate and 4.8 g. of a terpolymer of 76 parts methyl methacrylate, 20 parts isobutyl methacrylate and 4 parts methacrylic acid. The derived paste was charged into the plastograph and mixed at 75 rpm for 3 minutes with 11 g. one-fourth inch glass fibers (same as in Example I). 40 G. of the premix were molded in a 0.1 × 4 × 4 inch chase at 140° to 175°C., < 1,000 psi. in 5 minutes between aluminum foil backed up by nickel plates. A cured, tough plaque with a fiber-free surface of a dirty creme color was the product.

EXAMPLE XXI

A powdery mixture containing 22.85 g. calcium carbonate (same as in Example I), 1.5 g. zinc oxide, 0.4 g. zinc stearate and 0.4 g. "Microthene" FN 510 was added in a 4-oz. jar to a liquid mixture containing 10.6 g. styrene, 2.9 g. ethylene glycol dimethacrylate, 1.0 g. methacrylic acid, 0.2 g. t-butyl perbenzoate and 4.8 g. of a terpolymer of 76 parts methyl methacrylate, 20 parts isobutyl methacrylate and 4 parts methacrylic acid. An even white paste was derived and placed into the plastograph.

5.5 G. African Sisal fibers Grade 1 (International Harvester Co.) were added (chopped by hand to one-fourth inch length) and mixed at 50 rpm for 5 seconds using cam-style rollers. 37.0 G. of the premix were molded in a 0.1 × 4 × 4 inch chase at 1,000 psi. at 160°C. for 2 minutes between aluminum foil backed by nickel plates. A cured plaque showing a prominence of sisal fibers was obtained.

Izod impact, notched 2.0 ft-lb/in.

EXAMPLE XXII

A powdery mixture of 22.85 g. calcium carbonate (same as in Example I), 1.5 g. zinc oxide, 0.4 g. zinc stearate and 0.4 g. "Microthene" FN 510 was added in a 4-oz. jar to a liquid mixture of 10.6 g. styrene, 2.9 g. ethylene glycol dimethacrylate, 1.0 g. methacrylic acid, 0.2 g. t-butyl perbenzoate and 4.8 g. of a terpolymer of 76 parts methyl methacrylate, 20 parts isobutyl methacrylate and 4 parts methacrylic acid and mixed to an even paste. The paste was placed into the plastograph and 5 g. of one-quarter inch polyvinyl alcohol fibers ("Kuralon" of Kuraski Rayon Co., Ltd., Type VF) were added and mixed at 75 rpm for 3 minutes. 38.5 G. of the premix were molded between "Apollo" Ferrotype plates (same as in Example I) in a 4 × 4 × 0.1 inch chase for 5 minutes, < 1,000 psi. at 145° to 170°C. A white, opaque tough plaque without fiber prominence was the product.

EXAMPLE XXIII

A liquid resin composition was prepared by blending 58 parts styrene, 25 parts of a terpolymer of 76 parts of methyl methacrylate, 20 parts of isobutyl methacrylate and 4 parts of methacrylic acid, 15 parts methacrylic acid, 2 parts divinyl benzene in the form of a 50 to 60 percent solution and 1 part t-butyl perbenzoate. The liquid resin composition amounted to 450 grams. This was blended with a premixed filler composition containing 806 g. of calcium carbonate (same as in Example X), 11.25 g. calcium stearate, 11.25 g. "Microthene" FN 510, 20 g. of zinc oxide and 9.85 g. of magnesium oxide. The filler composition had been mixed by blending the calcium carbonate, calcium stearate and "Microthene" for 2 minutes on a Cowles Dissolver (Cowles Dissolver Corp., Inc., Cayuga, N.Y.). The oxides were then added and mixing was continued for 2 more minutes. The temperature of the blend after mixing was 45°C. 519 G. of this paste were placed in a Sigma-mixer and mixing commenced. 127 G. of one-fourth inch glass fibers (same as in Example I) were then added and mixing continued for 2 minutes. The bulk molding composition produced was removed and placed in a nylon bag. After 72 hours the composition was molded in a 6 × 6 inch plaque mold at 1,000 psi. at 150°C. for 3 minutes. The plaque had a smooth surface and the following properties:

Izod impact, notched 3.12 ft-lb/in
heat distortion temperature at 264 psi. 204°C.
flexural modulus $1.86 \times 10^6$ psi.
flexural strength 12,700 psi.

We claim:

1. A composition comprising (A) 20 to 60 percent by weight of a syrup comprising
   1. 40 to 70 percent by weight of base monomer comprising a member selected from the class consisting of vinyl substituted aromatic compounds containing six aromatic carbon atoms, monofunctional ethylenically unsaturated carboxylic acid ester and mixtures thereof;
   2. 10 to 40 percent by weight of an acid monomer system comprising 20 to 100 percent by weight ethylenically unsaturated carboxylic acid and 0 to 80 percent by weight of a member selected from the class consisting of ethylene glycol diester of ethylenically unsaturated carboxylic acid, divinyl aromatic compound, difunctional ethylenically unsaturated carboxylic acid ester, ethylenically unsaturated carboxylic acid anhydride, poly functional amines, aromatic diisocyanate and mixtures thereof;
   3. 15 to 35 percent by weight of thermoplastic polymer comprising a member selected from the class consisting of polymers of vinyl substituted aromatic compounds containing six aromatic carbon atoms; polymers of vinylidene substituted aromatic compounds containing six aromatic carbon atoms, acrylic polymers and mixtures thereof, and
   4. 0.2 to 2.5 percent by weight polymerization catalyst; (B) 20 to 60 percent by weight particulate filler; (C) 5 to 60 percent by weight fibrous material, and (D) 1 to 6 equivalents of a member selected from the class consisting of oxides of the Group IIA and IIB metals, the hydroxides of the Group IIA and IIB metals and mixtures thereof per equivalent of the ethylenically unsaturated carboxylic acid in the acid monomer system.

2. The composition of claim 1 in which the vinyl substituted aromatic compound containing six aromatic carbon atoms of the base monomer is styrene and the monofunctional ehtylenically unsaturated carboxylic acid ester of the base monomer is methyl methacrylate.

3. The composition of claim 2 in which the ethylenically unsaturated carboxylic acid of the acid monomer system is selected from the class consisting of acrylic acid and methacrylic acid, the ethylene glycol diester of ethylenically unsaturated carboxylic acid is selected from the class consisting of ethylene glycol dimaleate and ethylene glycol dimethacrylate; the divinyl aromatic compound is divinyl benzene, the ethylenically unsaturated carboxylic acid anhydride is maleic anhydride, the polyfunctional amine is diethylene triamine, the aromatic diisocyanate is toluene-2,4-diisocyanate and the difunctional ethylenically unsaturated carboxylic acid ester is selected from the class consisting of diallyl phthalate and glycidyl methacrylate.

4. The composition of claim 3 in which the polymer of vinyl substituted aromatic compounds containing six aromatic carbon atoms is selected from the class consisting of polystyrene and styrene/acrylonitrile copolymer, the polymer of vinylidene substituted aromatic compounds containing six carbon atoms is a polymer of alpha-methyl styrene and methyl methacrylate; and the acrylic polymers are selected from the class consisting of methyl methacrylate/ethyl acrylate copolymer, methyl methacrylate/ethyl acrylate/glycidyl methacrylate terpolymer, methyl methacrylate/isobutyl methacrylate/methacrylic acid terpolymer, methyl methacrylate/isobutyl methacrylate/acrylic acid terpolymer, methyl methacrylate/methacrylic acid copolymer, ethyl methacrylate/methacrylic acid copolymer and methyl methacrylate/ethyl acrylate/maleic anhydride terpolymer.

5. The composition of claim 4 in which oxides of Group IIA and IIB metals are selected from the class consisting of calcium oxide, barium oxide, magnesium oxide, and zinc oxide, and the hydroxides of the Group IIA and IIB metals are selected from the class consisting of calcium hydroxide, barium hydroxide, and magnesium hydroxide.

6. The composition of claim 5 in which the particulate filler is selected from the class consisting of calcium carbonate, asbestos powder, clay, kaolin, alumina, silica, wood flour, expanded perlite, and quartz.

7. The composition of claim 6 in which the fibrous material is selected from the class consisting of chopped glass, glass mat, polyvinyl alcohol fibers, sisal fibers, cotton fiber, asbestos fibers, and jute fiber.

8. The composition of claim 7 which also includes a polymerization inhibitor.

9. The composition of claim 8 which also contains polyolefin.

10. The composition of claim 9 wherein the composition comprises 25 to 35 percent by weight syrup, 45 to 55 percent by weight particulate filler, 20 to 30 percent by weight fibrous material, and 1.1 to 2.5 equivalents of the member selected from the class consisting of oxides of the Group IIA and IIB metals, the hydroxides of the Group IIA and IIB metals and mixtures thereof per equivalent of the ethylenically unsaturated carboxylic acid in the acid monomer system.

11. The composition of claim 10 in which the syrup comprises 50 to 60 percent 60 weight base monomer, 15 to 25 percent by weight acid monomer system, 20 to 30 percent by weight thermoplastic polymer and 0.5 to 1.5 percent by weight polymerization catalyst.

12. The composition of claim 11 which also includes a lubricant.

13. The composition of claim 12 which also includes a polymerization accelerator.

14. The composition of claim 11 in which the base monomer is styrene, the acid monomer system comprises methacrylic acid and ethylene glycol dimethacrylate, the thermoplastic polymer is methyl methacrylate/isobutyl methacrylate/methacrylic acid terpolymer, the polymerization catalyst is t-butyl perbenzoate, the particulate filler is calcium carbonate, the fibrous material is glass fibers and the member of (D) is zinc oxide.

15. The composition of claim 11 in which the base monomer is styrene, the acid monomer system is methacrylic acid, the thermoplastic polymer is methyl methacrylate/isobutyl methacrylate/methacrylic acid terpolymer, the polymerization catalyst is t-butyl perbenzoate, the particulate filler is calcium carbonate, the fibrous material is glass fibers and the member of (D) is a mixture of zinc oxide and magnesium oxide.

16. The composition of claim 11 in which the base monomer is styrene, the acid monomer system comprises methacrylic acid and divinyl benzene, the thermoplastic polymer is methyl methacrylate/isobutyl methacrylate/methacrylic acid terpolymer, the polymerization catalyst is t-butyl perbenzoate, the particulate filler is calcium carbonate, the fibrous material is glass fibers and the member of (D) is a mixture of zinc oxide and magnesium oxide.

* * * * *

PO-1050
(5/69)

UNITED STATES PATENT OFFICE
CERTIFICATE OF CORRECTION

Patent No. 3,789,051          Dated January 29, 1974

Inventor(s) RICHARD WATKIN REES & HANS-GEORG REINHARDT

It is certified that error appears in the above-identified patent and that said Letters Patent are hereby corrected as shown below:

Col. 14, Claim 11, line 63, "60 percent 60 weight" should read -- 60 percent by weight --.

Signed and sealed this 3rd day of September 1974.

(SEAL)
Attest:

McCOY M. GIBSON, JR.
Attesting Officer

C. MARSHALL DANN
Commissioner of Patents